Patented Oct. 24, 1950

2,527,376

UNITED STATES PATENT OFFICE 2,527,376

POLYACETAL POLYSULFIDE POLYMER

Joseph C. Patrick, Morrisville, Pa., assignor to Thiokol Corporation, Trenton, N. J., a corporation of Delaware No Drawing. Application January 9, 1946, Serial No. 640,148

12 Claims. (Cl. 260—79.1)

This invention is a continuation-in-part of copending application Serial No. 554,545 filed September 16, 1944, which is now abandoned and relates to polysulfide polymers, more particularly such as may be made by the reactions described herein and in said copending application, i. e., by reacting an alkaline polysulfide with a mixture of polyhalogenated organic compounds composed essentially of (1) the condensation product of an aldehyde with a glycerol halohydrin and (2) an organic compound containing only two halogen atoms connected respectively to different carbon atoms. In the mixture the molar ratio of (1) to (2) is controlled so as to lie within the range of about 1 to 1000 to 1 to 50. There are two kinds of glycerol halohydrins—the monohalohydrins and dihalohydrins. The dihalohydrins react with an aledhyde by condensation to form tetrahalodipropyl acetals which are monomeric. The monohalohydrins are bifunctional in respect of OH groups and condense with an aldehyde to form polymers containing a number of halogen atoms greater than two, the exact number depending on the degree of polymerization. In controlling the molar ratio of (1) to (2) as above mentioned, in the case of polyhalogen condensation products of aldehydes and monohalohydrins, the number of mols of condensation product is calculated as the number of mols of monohalohydrin condensed with aldehyde.

By employing mixtures of (1) to (2) and controlling the molar ratios as above mentioned effects are obtainable which cannot be obtained by the use of compounds of class 1 or class 2 alone. Copolymers may be obtained having a wide variety of valuable properties in respect of resistance to cold flow, plasticity, combinations of plasticity and elasticity. Techniques of this kind expand the fields of usefulness of the polysulfide polymers and indeed create a new class of polymers having properties which may be tailormade, by using the invention of said techniques, to meet a wide variety of commercial demands. As the ratio of class (1) to class (2) increases within the stated range, compounds, i. e., polymers, may be obtained, especially after curing, that possess a high degree of elasticity, toughness and resistance to cold flow combined with other valuable properties. As that ratio decreases polymers may be made sufficiently soft for use, especially when uncured, as chewing gum and yet possessing just enough resiliency to make a "live" chew.

Illustrations of the preparation of compounds of class (1) are given in Equations I to V below and Examples 1 to 5, inclusive.

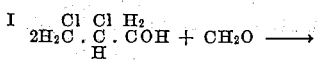

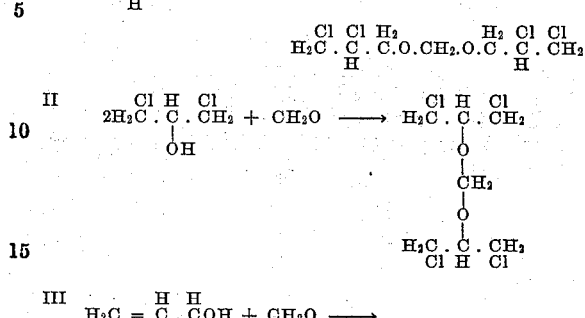

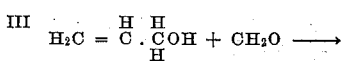

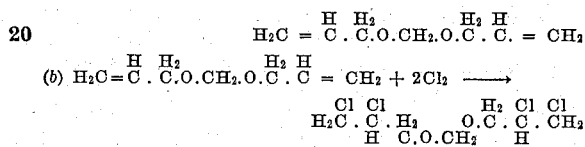

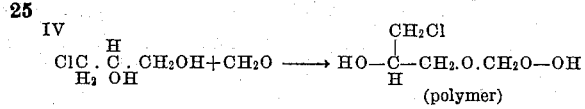

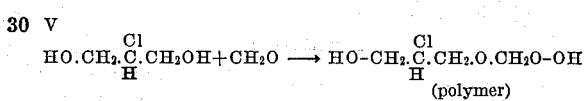

In Reactions I and II the hydrin is monofunctional as to the hydroxyl group and monomeric products, di(2,3 dichloro isopropyl) formal are obtained, respectively.

Reaction III shows a different method for producing the product of Reaction I.

In Reactions IV and V, the halohydrins are bifunctional and reaction with aldehydes produces polymers, so indicated in the chemical reactions symbolically written. The products obtained are all acetals, monomeric or polymeric. When formaldehyde is used, the products are formals.

The products obtained by Reactions IV and V may be described as polyhalopropyl polyacetals or specifically as polychlorpropyl polyformals.

In these various reactions the radical —SH may be substituted for —OH and the products are then thioacetals or polythioacetals, thioformals and polythioformals.

Specific details of the above reactions are given as follows, the numbers of the examples corresponding to the numbers assigned to the above reactions.

Example 1

Two mols of 2,3 dichloro propanol-1 are dissolved in about 200 cubic centimeters of benzene and slightly more than 1 mol of formaldehyde, preferably in the form of paraformaldehyde, is added. A trace of acid catalyst is put into the mixture such as, for example, one drop of concentrated hydrochloric acid, and the mixture is refluxed at the boiling point of benzene in an esterification flask fitted with a trap for the removal of water and connected so that the benzene will be continuously returned to the reaction flask. The refluxing with removal of water is continued until substantially one mol of 18 cubic centimeters of water have been removed. The mixture in the flask is then transferred to a regular distilling apparatus and the benzene is distilled off, leaving the reaction product which is the tetrachloro dipropanol formal. The product obtained is a slightly viscous liquid boiling at 145–148° C. at 3 mm. pressure and having a specific gravity of 1.35.

Example 2

Proceed as above, substituting 1,3 dichloro propanol-2 for the 2,3 dichloro propanol-1. The product is a white crystalline solid, melting at 53° C. and boiling at 130–132° C. at 2 mm. pressure.

Example 2A

Proceed as in either of Examples 1 or 2, substituting a mixture of the chloro compounds for the single compounds. The product is a liquid.

Example 3

Two mols of allyl alcohol are treated with slightly more than one mol of formaldehyde in the presence of a trace of acid, e. g., HCl, as a catalyst to give diallyl formal. The ethylenic linkages are then saturated with a halogen to give a tetrahalo compound corresponding to the product formed in Example 1. The preferred method of performing this reaction is to dissolve the diallyl formal in $CCl_4$ and add the halogen in solution in $CCl_4$ to the solution of diallyl formal compounds.

Example 4

Proceed as in Example 1 or 2, substituting alpha monochlorhydrin for the 2,3 dichloro propanol-1 and slightly more than 2 mols of formaldehyde. A polymer is formed which is a viscous amber liquid, specific gravity 1.26. By reacting for a longer time, a wax is obtained.

Example 5

Proceed as in Example 4, substituting beta-monochlorhydrin for the alpha hydrin. The product obtained is similar to that of Example 4.

Compounds of class (2) are organic compounds in general containing two and only two halogen atoms connected to different carbon atoms respectively. Numerous examples or species thereof are shown in various Patrick patents. See, for example, U. S. Patents 2,216,044 and 1,890,191. All the compounds shown specifically or generically described therein may be used. Mixtures thereof may also be used. The carbon atoms to which the halogen atoms are attached may be adjacent as specifically illustrated in 1,890,191 or separated by and joined to intervening atomic structure of diverse character as fully explained generically and specifically in 2,216,044.

In proceeding according to the present invention a mixture is made composed essentially of one or more compounds of class (1) and one or more compounds of class (2) and the total mols of (1) in relation to the total mols of (2) are controlled so that the molar ratio of (1) to (2) falls within the limits of about 1 to 1000 to 1 to 50. With the clear understanding that the principles of the invention, to be defined in the claims, are generic in character and may be embodied in a great many specifically different forms, the following specific example is submitted by way of illustration but not limitation:

Example 6

Three liters of a 2-molar solution of sodium disulfide are placed in a three-necked flask of five liter capacity equipped with means for mechanical agitation and a thermometer to indicate temperatures. To this solution is added a solution of 10 grams of NaOH in 15 cc. of water followed by a solution of 25 grams of crystallized magnesium chloride ($MgCl_2.6H_2O$) in 50 cc. of water. The mixture is heated at a temperature of about 160° F., and to it are added a mixture of 5 mols of BB' dichlordiethyl formal and 0.025 mols of either of the compounds obtained by Reactions I and II or the equivalent proportions of the polymers obtained by Reactions IV and V. The addition of the mixed chlorides is carried out slowly in such a manner that the complete addition requires about one hour.

During the addition of the mixed chlorides an exothermic condition takes place, and the temperature rises to about 180° F. When the reaction is completed, the temperature is maintained at 180° F. for approximately one hour, after which the latex that has been formed as a result of the reaction is permitted to settle out of the reaction liquid and the supernatant liquid is then removed by decantation or siphoning.

The latex is treated with successive washes of warm water until entirely free from water-soluble impurities, after which it is transferred to a suitable receptacle and dilute acid is added until the reaction of the supernatant liquid is brought to a pH of about 6, whereupon a phenomenon analogous to coagulation of rubber latex takes place. The coagulum so formed is then kneaded with cold water until every trace of residual acid is removed, after which the soft elastic mass is dried.

In the above reaction of Example 6, various soluble sulfides may be substituted for the sodium disulfide in fact soluble sulfides in general may be so substituted, e. g., soluble sulfides having the formula $MS_{2\ to\ 6}$ where M is an alkali or alkaline earth metal or ammonium or substituted ammonium. Moreover, the corresponding monosulfides may be also substituted. Various mixtures of monosulfides and polysulfides may also be used.

What is claimed is:

1. Process of making a polysulfide polymer which comprises heating an alkaline polysulfide with a mixture of polyhalogenated organic compounds composed essentially of (1) a bis (dihalopropyl) acetal and (2) an organic compound containing only two halogen atoms and no other effective reactive groups connected respectively to different carbon atoms, the molar ratio of (1) to (2) lying in the range of about 1 to 1000 to 1 to 50.

2. Process of making a polysulfide polymer which comprises heating an alkaline polysulfide with a mixture of polyhalogenated organic compounds composed essentially of (1) a bis (dichloropropyl) formal and (2) an organic compound containing only two halogen atoms and no other effective reactive groups connected respectively to different carbon atoms, the molar ratio of (1) to (2) lying in the range of about 1 to 1000 to 1 to 50.

3. Process of making a polysulfide polymer which comprises heating an alkaline polysulfide with a mixture of polyhalogenated organic compounds composed essentially of (1) the acetal condensation product of a glycerol monohalohydrin and an aldehyde and (2) an organic compound containing only two halogen atoms and no other effective reactive groups, connected respectively to different carbon atoms, the molar ratio of (1) to (2) lying in the range of about 1 to 1000 to 1 to 50.

4. Process of making a polysulfide polymer which comprises heating an alkaline polysulfide with a mixture of polyhalogenated organic compounds essentially of (1) the formal condensation product of a glycerol monochlorhydrin and formaldehyde and (2) an organic compound containing only two halogen atoms and no other effective reactive groups connected respectively to different carbon atoms, the molar ratio of (1) to (2) lying in the range of about 1 to 1000 to 1 to 50.

5. The process of making a polysulfide polymer which comprises heating an alkaline polysulfide with a mixture of polyhalogenated organic compounds composed essentially of (1) BB' dichlordiethyl formal and (2) a compound selected from the group consisting of di (2,3 dichloro n-propyl) formal and di (1,3 dichloro isopropyl) formal, the molar ratio of (2) to (1) lying within the range of about 1 to 1000 and 1 to 50.

6. A polysulfide polymer made by the process of claim 1.

7. A polysulfide polymer made by the process of claim 2.

8. A polysulfide polymer made by the process of claim 3.

9. A polysulfide polymer made by the process of claim 4.

10. A polysulfide polymer made by the process of claim 5.

11. Process of making a polysulfide polymer which comprises heating an alkaline polysulfide with a mixture of (1) the acetal condensation product of a glycerol halohydrin and an aldehyde and (2) an organic compound containing only two halogen atoms and no other effective reactive groups, connected respectively to different carbon atoms, the molar ratio of (1) to (2) lying in the range of about 1 to 1000 to 1 to 50.

12. A polysulfide polymer made according to the process of claim 11.

JOSEPH C. PATRICK.

REFERENCES CITED

The following references are of record in the file of this patent:

UNITED STATES PATENTS

| Number | Name | Date |
|---|---|---|
| 2,166,507 | Schröter | July 18, 1939 |
| 2,221,650 | Patrick | Nov. 12, 1940 |
| 2,278,128 | Patrick | Mar. 31, 1942 |
| 2,374,963 | Vass | May 1, 1945 |
| 2,402,977 | Patrick et al. | July 2, 1946 |